US012584778B2

(12) United States Patent
Schott et al.

(10) Patent No.: US 12,584,778 B2
(45) Date of Patent: Mar. 24, 2026

(54) AUTOMATIC DISTANCE MEASUREMENT IN A FLOW CHANNEL

(71) Applicant: Testo SE & Co. KGaA, Titisee-Neustadt (DE)

(72) Inventors: Stefan Schott, Oberbergen (DE); Sebastian Bach, Breitnau (DE); Michael Kampferbeck, Kirchzarten (DE); Sarah Eisenkolb, Titisee-Neustadt (DE); Benjamin Landenberger, Freiburg (DE)

(73) Assignee: Testo SE & Co. KGaA, Titisee-Neustadt (DE)

( * ) Notice: Subject to any disclaimer, the term of this patent is extended or adjusted under 35 U.S.C. 154(b) by 354 days.

(21) Appl. No.: 18/295,415

(22) Filed: Apr. 4, 2023

(65) Prior Publication Data

US 2023/0324212 A1     Oct. 12, 2023

(30) Foreign Application Priority Data

Apr. 7, 2022    (DE) .......................... 102022108402.7

(51) Int. Cl.
*G01F 15/18*          (2006.01)
*G01D 5/26*          (2006.01)

(52) U.S. Cl.
CPC .............. *G01F 15/18* (2013.01); *G01D 5/26* (2013.01)

(58) Field of Classification Search
CPC . G01F 1/00; G01F 1/002; G01F 15/18; G01F 1/11; G01F 1/66; G01F 1/6842; G01F 25/10

USPC .......... 73/272 R, 1.73, 1.79, 1.81, 1.75, 314, 73/861.26–861.29, 597–598, 602, 610, 73/1.16
See application file for complete search history.

(56) References Cited

U.S. PATENT DOCUMENTS

| | | | |
|---|---|---|---|
| 6,584,860 B1 * | 7/2003 | Feller ...................... | G01F 1/106 |
| | | | 73/861.25 |
| 6,973,842 B1 | 12/2005 | Feller | |
| 2013/0096423 A1 * | 4/2013 | Yamamoto ............. | A61B 1/008 |
| | | | 600/103 |
| 2021/0164341 A1 * | 6/2021 | Pfutzner ............... | G01F 1/7082 |
| 2021/0172816 A1 | 6/2021 | Huck | |

FOREIGN PATENT DOCUMENTS

| | | |
|---|---|---|
| CN | 215573150 U | 1/2022 |
| DE | 4016529 C1 | 11/1991 |

* cited by examiner

*Primary Examiner* — John Fitzgerald
*Assistant Examiner* — Truong D Phan
(74) *Attorney, Agent, or Firm* — Volpe Koenig

(57)          ABSTRACT

In flow probes (11) including measuring sensors (2) on a distal end (3) of a shaft (4), it is also provided to configure at least one distance sensor (7, 8, 9) and an acceleration sensor (16) on this distal end (3), in order to enable an automatic distance measurement and/or determination of the position and/or the orientation of the measuring sensor (2) within a measuring range (6), and thus the recording of spatially resolved measured values.

11 Claims, 1 Drawing Sheet

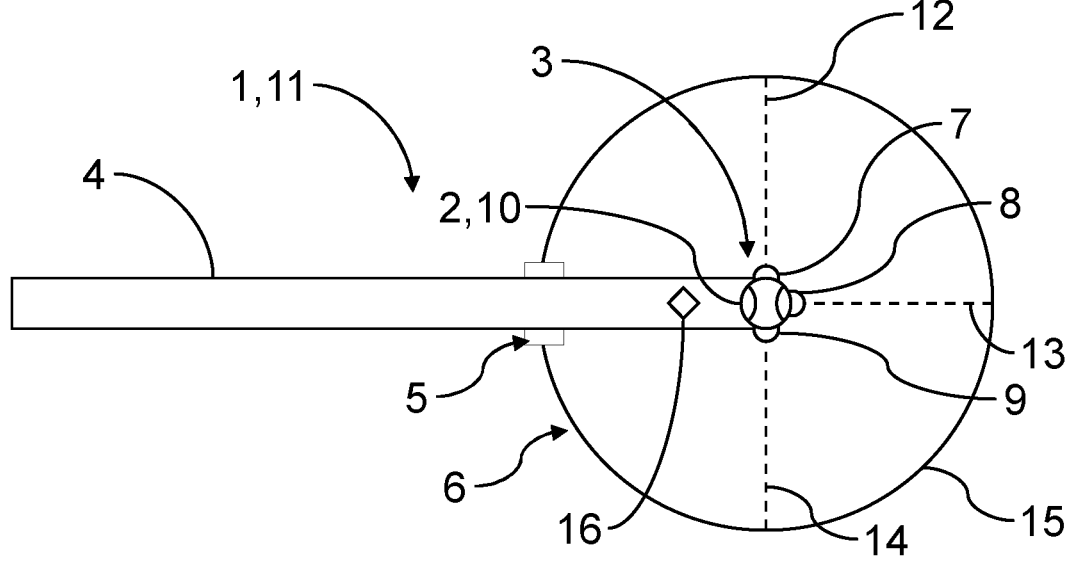

AUTOMATIC DISTANCE MEASUREMENT IN A FLOW CHANNEL

CROSS-REFERENCE TO RELATED APPLICATIONS

This application claims priority to German Patent Application No. 10 2022 108 402.7, filed Apr. 7, 2022, which is incorporated herein by reference as if fully set forth.

TECHNICAL FIELD

The invention relates to a flow probe comprising a measuring sensor which is configured on a distal end of a shaft.

The invention further relates to a method for recording a location-dependent measured variable, wherein a measuring sensor is brought into a measuring range to be measured, which is defined by a boundary.

BACKGROUND

Such flow probes and methods are known and are used to record location-dependent measured variables. They are used for example for volume flow measurement in channels, especially flow channels. Here, the channel geometry must be known and entered into the flow probe. The flow probe then specifies for example the positions at which the measured variable is to be determined by means of a measuring probe, in order for example to determine a measured variable profile or to determine the measured variable at a specific position. The predetermined measuring points must then be traversed manually with the measuring probe, which can be mounted on a shaft. The user must manually take the reading off the shaft for example to see whether the measuring position has been reached. This manual approach is prone to errors.

SUMMARY

The object of the invention is to improve the usability of such flow probes and methods and to reduce the error rate of the measured variable determination.

One or more of the features disclosed herein are provided according to the invention for achieving the aforementioned object. In particular, in order to achieve the aforementioned object in flow probes of the type initially described, it is thus proposed according to the invention that at least one distance sensor is arranged on the distal end of the shaft.

Thus, a distance of the distal end of the shaft from for example surrounding channel and/or pipe walls can be determined. From this, a position of the distal end of the shaft can then be determined. Since the measuring probe is attached to the distal end of the shaft, its position is also known. This information can be used to automatically determine location-dependent measured variables. Here for example a measured variable profile can be created by traversing various positions with the distal end of the shaft. However, the user can also be informed as soon as the distal end has reached a predetermined measuring position. In particular, the distal end can extend over less than 50%, preferably less than 40%, of the length of the shaft. The length of the shaft occupied by the distal end can be selected in such a way that it reaches and/or exceeds a maximum extent in particular of the cross-sectional area of the measuring range to be examined.

In an advantageous embodiment, it may be provided that the measuring sensor is configured to perform a measurement as a function of a distance measured with the at least one distance sensor. Alternatively or additionally, it may be provided that the at least one distance sensor is configured for a continuous measurement of a distance.

Thus, a measurement performed by the measuring sensor can for example be triggered exactly when a certain position of the measuring sensor within the area to be examined, for example a channel or pipe, is reached. A control unit can be provided which processes the data of the measuring sensor and/or of the at least one distance sensor and/or of the further sensors of the flow probe, and/or triggers a measurement of the measuring sensor as a function of a distance determined by means of the at least one distance sensor. By means of the continuous measurement of a distance, it is possible to make a continuous movement of the measuring sensor within the area to be examined, during which distances are continuously determined, and wherein measurements are triggered when certain distances are reached. This is particularly advantageous if measurements are to be taken at specific intervals in order to meet certain guideline requirements. Here, alternatively or additionally, measurements can be taken automatically and/or manually at specific time intervals. The intervals or time intervals on the basis of which a measurement is to be triggered can for example be predefinable by a user.

In an advantageous embodiment, it may be provided that an acceleration sensor is provided. The acceleration sensor can preferably be arranged on the distal end.

Thus, the orientation of the probe in the gravitational field can be determined. Together with the measured values of the at least one distance sensor, a more precise position of the flow probe, in particular of its distal end, can thus be determined, for example in the form of a reliable height coordinate in a channel and/or pipe cross-section.

Thus, the location-dependent measured variable can be a flow rate. Thus, for example volume flow measurements in channels are possible. For example, a volume flow profile can be determined over the cross-sectional area of the channel.

In an advantageous embodiment, it may be provided that the distance sensor is a laser distance sensor.

Thus, the distance can be determined optically. This is possible without contact and is not influenced for example by an air flow. The distance can also be determined particularly accurately. The determined distance can be read out electronically and processed further.

In an advantageous embodiment, it may be provided that at least two distance sensors which are oriented in different directions are arranged on the distal end.

Thus, distances can be determined in several directions. It is thus possible to determine a two-dimensional position. For example, the position of the distal end within the cross-sectional area of a channel can be determined.

In an advantageous embodiment, it may be provided that the flow probe comprises a signal generator for outputting a signal. The signal can for example be a visual and/or acoustic signal. In addition, it may be provided that the signal can be output as a function of a distance determined with the at least one distance sensor.

The signal generator can for example be a luminous element and/or a loudspeaker. Thus, a user can be informed when the flow probe or measuring sensor has reached a predefined position. The user can then for example hold the flow probe in the current position in order to record a sufficiently long measurement. If the measurements are very brief, the user can take the signals as a confirmation signal and move the flow probe further. Reaching a predefined position can for example be detectable by means of the at least one distance sensor.

Alternatively or additionally, according to the invention, the features of the alternative independent claim directed to a method for recording a location-dependent measured variable are provided for achieving the aforementioned object. In particular, in order to achieve the aforementioned object in methods of the type initially described, it is thus proposed according to the invention that with the measuring sensor, at least one distance sensor is brought into the measuring range, via which at least one distance of the measuring sensor from the boundary is recorded at the time of a measurement. The measurement, the point in time of which is relevant, is the measurement performed by means of the measuring sensor. In addition, it may be provided that the distance is recorded continuously.

Thus, an automatic and in particular continuous determination of a position of the measuring sensor can take place. This position can be recorded, stored and/or further processed together with a respective measured value.

In an advantageous embodiment, it may be provided that an orientation in the gravitational field is determined by means of an acceleration sensor. This can involve the orientation of the measuring sensor and/or the at least one distance sensor. The acceleration sensor can be fixedly connected to the measuring sensor and/or the at least one distance sensor.

Thus, measured values of the acceleration sensor can be recorded, which increase the accuracy of the position determination of the flow probe, in particular of its distal end or of the measuring sensor, especially in interaction with measured values of the at least one distance sensor.

In an advantageous embodiment, it may be provided that the orientation determined by means of the acceleration sensor is used to inform a user about the orientation. This can involve informing the user about an impermissible orientation. Alternatively or additionally, it may be provided that the orientation is determined at the time of a measurement. Alternatively or additionally, it may be provided that measured values of the measuring sensor are corrected by a deviation of the orientation from an ideal.

In this way, the user can be assisted in orienting the flow probe, particularly in a non-visible measuring range. The user can for example be informed if the measuring sensor is not optimally oriented and would output unreliable data. The user can also be informed that the measuring sensor has reached a previously determined position, whereupon a measurement can be triggered automatically or manually. If the orientation is determined at the time of a measurement, this information can be stored for the purpose of documentation and/or used in a later method step.

For example, measured values of the measuring sensor can be corrected by a deviation of the orientation from an ideal. For example, the orientation determined at the time of the measurement can be used here. The ideal can be defined for example as a specific orientation of the measuring sensor relative to the prevailing flow in the measuring range. Deviations of the actual orientation from the ideal can for example be correctable to a certain degree based on the actual orientation determined. If the deviation of the orientation from the ideal exceeds a sufficiently correctable level, the user can be actively informed in order to change the orientation of the measuring sensor.

In an advantageous embodiment, it may be provided that measured values of the measuring sensor are output with an associated at least one distance. Alternatively or additionally, it may be provided that measured values of the measuring sensor are output with an associated orientation.

Thus, the information about the at least one distance or the orientation, in particular the orientation already described, can for example be further processed electronically. Measured values can also be output with additional, associated parameters, such as the duration of a measurement. The output of the measured values, in particular with associated distances, orientations and/or durations, can for example take place in a memory unit for documentation.

In an advantageous embodiment, it may be provided that the measuring range is two-dimensional or three-dimensional.

Thus, location-dependent measured values can be determined at different positions within the measuring range. In particular, two- and/or three-dimensional measured variable profiles can be determined.

In an advantageous embodiment, it may be provided that the measured variable is a flow rate.

Thus, the previously mentioned advantages can be used in measurements of flow rates. In particular, one-, two- and/or three-dimensional flow profiles can be created. This also enables automatic, spatially resolved volume flow measurement in channels.

In an advantageous embodiment, it may be provided that the measuring sensor is inserted into the measuring range through an opening in the boundary which is preferably matched to a size of the measuring sensor.

Thus, the opening through which the measuring sensor is inserted into the measuring range can be kept as small and/or large as necessary. The opening can be selected to be just large enough that, after the measuring sensor has been inserted, said opening is sealed off to the outside just enough that movement of the measuring sensor over the measuring range is possible. Thus, external disturbances of the measuring range and the measurement results can be reduced and/or avoided.

In an advantageous embodiment, it may be provided that a geometric quantity is determined from measured values of the at least one distance sensor and/or the acceleration sensor. The geometric quantity can in particular be the shape and/or the size of the measuring range. Alternatively or additionally, it may be provided that a measuring location is determined from the measured values.

Thus, a measurement of the measuring range is possible. For example, the shape and/or size of the measuring range can also be determined if a channel and/or pipe to be examined has an internal dimension that deviates from an external dimension, for example due to the presence of insulation. Dimensions that can be determined by means of the at least one distance sensor and/or the acceleration sensor can also be predetermined for different measuring ranges, so that a measuring location can be determined. This can for example be a specific access into a channel and/or a pipe. Alternatively or additionally, determinable dimensions outside the measuring range can be used here, which are determined for example during an insertion of the flow probe into the measuring range.

In an advantageous embodiment, it may be provided that a measurement is performed by the measuring sensor as a function of a distance determined by means of the at least one distance sensor. Alternatively or additionally, it may be provided that a measurement by the measuring sensor takes place as a function of a determined position of the measuring sensor in the measuring range.

Thus, a measurement by means of the measuring sensor can be triggered exactly when the measured distance corresponds to a previously determined distance. A measurement by means of the measuring sensor can also be triggered exactly when a determined position corresponds to a previously determined position. Such previously determined positions and distances can be gathered for example from guidelines, according to which measured values are to be determined at certain distances or at certain positions. It is also possible first to determine a geometry of the measuring range by means of the at least one distance sensor, in particular for example by manually moving the distance sensor through the measuring range, and then to define the distances or positions at which a measurement is to be made. Alternatively or additionally, measurements can be triggered at specific time intervals. The measurements can be output for example by means of an associated measured at least one distance or determined position of the measuring sensor, or with an associated measurement duration.

In an advantageous embodiment, it may be provided that a flow probe according to the invention is used in the method.

Thus, the advantages of a flow probe according to the invention can be used in methods according to the invention.

In an advantageous embodiment, it may be provided that an overlap of the measuring range is determined by the flow probe. Alternatively or additionally, it may be provided that measured values of the measuring sensor are corrected by the overlap of the measuring range.

Insertion of the flow probe into the measuring range is associated with an overlap of the measuring range by the flow probe. The overlap can for example be the projection in particular of the external dimensions of the flow probe onto the cross-sectional area of the measuring range, which is preferably orthogonal to the flow direction. This overlap can lead to flow changes in particular in comparatively small measuring ranges, for example in channels and/or pipes having a small cross-sectional area. Thus, deviations of the determined measured values from the existing flow conditions can occur and/or be magnified. By determining the overlap of the measuring range by the flow probe, for example based on the measured values of the at least one distance sensor and/or the acceleration sensor, it can thus be possible to correct the measured values of the measuring sensor in order to produce more accurate measurement results.

In an advantageous embodiment of a flow probe according to the invention, for which protection is also claimed independently, it may be provided that the flow probe is configured to carry out a method according to the invention.

Thus, the advantages of methods according to the invention can be used with measuring devices according to the invention.

The invention will now be described in greater detail with reference to an exemplary embodiment, but is not limited to the exemplary embodiment. Further embodiments can be gathered by combining the features of individual or several claims with each other and/or with individual or several features of the exemplary embodiment.

BRIEF DESCRIPTION OF THE DRAWINGS

In the drawings:

FIG. 1 shows a schematic representation of a flow probe according to the invention.

DETAILED DESCRIPTION

FIG. 1 shows a schematic representation of a measuring device 1 designed as a flow probe 11 according to the invention comprising a measuring sensor 2 which is formed on a distal end 3 of a shaft 4. The shaft 4 of the measuring device 1 is inserted with its distal end 3 first into a measuring range 6 through an opening 5 which is matched to a size of the measuring sensor 2. Distance sensors 7, 8, 9 are also configured on the distal end 3 and oriented in different directions. The measuring sensor 2 is a volume flow sensor 10. The measured variable is a flow rate. The distance sensors 7, 8, 9, which are laser distance sensors, determine the distances 12, 13, 14 of the distal end 3 from the boundary 15 of the measuring range 6. Thus, the determined distances or a position of the distal end 3 of the shaft 4 calculated therefrom and thus also of the measuring sensor 2 can be recorded and/or output together with the respective measured values. In this case, the measuring range 6 is also multidimensional. Furthermore, an acceleration sensor 16 is arranged on the distal end 3. By means of the measuring device 1, it is possible to make a measurement as a function of a distance 12, 13, 14 measured with the at least one distance sensor 7, 8, 9. The at least one distance sensor 7, 8, 9 can be configured for a continuous measurement of a distance 12, 13, 14. The measuring device comprises a signal generator, which is not shown in greater detail, for outputting a visual and acoustic signal, wherein the signal can be output as a function of a distance 12, 13, 14 determined with the at least one distance sensor 7, 8, 9. The signal transmitter is a combination, not shown in detail, of a luminous element with a loudspeaker.

The measuring device 1 shown is suitable for carrying out a method according to the invention. Here, at least one distance sensor 7, 8, 9 is inserted into the two-dimensional or three-dimensional measuring range 6 with the measuring sensor 2. The measured variable is a flow rate. With the distance sensors 7, 8, 9, at least a distance 12, 13, 14 of the measuring sensor 2 from the boundary 15 is recorded at the time of the measurement, even continuously. An orientation of the measuring sensor 2 and the distance sensors 7, 8, 9 in the gravitational field is determined by means of the acceleration sensor 16 fixedly connected to the measuring sensor 2 and the distance sensors 7, 8, 9. The orientation determined by means of the acceleration sensor 16 is used to inform a user about the orientation, for example an impermissible orientation, and is determined at the time of a measurement. Measured values of the measuring sensor 2 are corrected by a deviation of the orientation from an ideal and are output with associated distances 12, 13, 14 and an associated orientation. From measured values of the at least one distance sensor 7, 8, 9 and the acceleration sensor 16, a geometric quantity, namely the shape and the size of the measuring range 6, as well as a measuring location, are determined. The measurement by the measuring sensor 2 is performed as a function of a distance 12, 13, 14 recorded by means of the at least one distance sensor 7, 8, 9 and as a function of a determined position of the measuring sensor 2 in the measuring range 6. A visual signal and an acoustic signal are output when the distance 12, 13, 14 determined by means of the at least one distance sensor 7, 8, 9 corresponds to a previously determined distance and when the determined position of the measuring sensor 2 corresponds to a previously determined position. The measured values of the measuring sensor 2 are also corrected by an overlap of the measuring range 6 by means of the measuring device 1.

In measuring devices 1 comprising measuring sensors 2 on a distal end 3 of a shaft 4, it is thus proposed also to configure at least one distance sensor 7, 8, 9 and/or an acceleration sensor 16 on this distal end 3, in order to enable an automatic distance measurement and/or determination of the position and/or orientation of the measuring sensor 2 within a measuring range 6, and thus the recording of spatially resolved measured values (see FIG. 1).

LIST OF ELEMENT NUMBERS

1 Measuring device
2 Measuring sensor
3 Distal end
4 Shaft
5 Opening
6 Measuring range
7 Distance sensor
8 Distance sensor
9 Distance sensor
10 Volume flow sensor
11 Flow probe
12 Distance
13 Distance
14 Distance
15 Boundary
16 Acceleration sensor

The invention claimed is:

1. A flow probe (11), comprising:
a measuring sensor (2) on a distal end (3) of a shaft (4);
at least one distance sensor (7, 8, 9) arranged on the distal end (3);
an acceleration sensor (16) arranged on the distal end (3);
wherein a shape and a size of a measuring range (6), and a measuring position of the measuring sensor (2) in the measuring range (6) is determined from measured values of the at least one distance sensor (7, 8, 9) and the acceleration sensor (16); and
the measuring sensor (2) is configured to perform a measurement as a function of a distance (12, 13, 14) measured with the at least one distance sensor (7, 8, 9) and based on the measuring position of the measuring sensor (2) in the measuring range (6), an overlap of the measuring range (6) by the flow probe (11) based on the measured values of the at least one distance sensor (7, 8, 9) and the acceleration sensor (16) is determined, and the measured values of the measuring sensor (2) are corrected by the overlap of the measuring range (6).

2. The measuring device (1) as claimed in claim 1, wherein the at least one distance sensor comprises at least two, of the distance sensors (7, 8, 9) which are oriented in different directions and arranged on the distal end (3).

3. The measuring device (1) as claimed in claim 1, further comprising a signal generator for outputting a signal, and the signal is adapted to be output as a function of a distance (12, 13, 14) determined with the at least one distance sensor (7, 8, 9).

4. The measuring device (1) according to claim 1, wherein the at least one distance sensor (7, 8, 9) is configured for a continuous measurement of a distance (12, 13, 14).

5. The measuring device (1) according to claim 1, wherein the distance sensor (7, 8, 9) is a laser distance sensor.

6. A method for recording a location-dependent measured variable, the method comprising:
bringing a measuring sensor (2) into a measuring range (6) to be measured, which is defined by a boundary (15);
via the measuring sensor (2), bringing at least one distance sensor (7, 8, 9) into the measuring range (6);
recording at least one distance (12, 13, 14) of the measuring sensor (2) from the boundary (15) at a time of a measurement;
determining an orientation of the at least one of the measuring sensor (2) or the at least one distance sensor (7, 8, 9) in a gravitational field using an acceleration sensor (16) fixedly connected to at least one of the measuring sensor (2) or the at least one distance sensor (7, 8, 9);
from measured values of the at least one distance sensor (7, 8, 9) and the acceleration sensor (16), determining a geometric variable, a shape and size of the measuring range (6), and a measuring location of the measuring sensor (2) in the measuring range (6);
performing a measurement by the measuring sensor (2), wherein the measurement is based on the at least one distance (12, 13, 14) measured with the at least one distance sensor (7, 8, 9) and based on a determined position of the measuring sensor (2) in the measuring range (6) and
determining an overlap of the measuring range (6) by the flow probe (11) based on the measured values of the at least one distance sensor (7, 8, 9) and the acceleration sensor (16), and correcting the measured values of the measuring sensor (2) by the overlap of the measuring range (6).

7. The method as claimed in claim 6, further comprising at least one of a) using the orientation determined by the acceleration sensor (16) to inform a user about the orientation at the time of a measurement, or b) correcting measured values of the measuring sensor (2) by a deviation of the orientation from an ideal.

8. The method as claimed in claim 6, further comprising outputting measured values of the measuring sensor (2) with at least one of an associated at least one distance (12, 13, 14) or an associated orientation.

9. The method as claimed in claim 6, further comprising inserting the measuring sensor (2) into the measuring range (6) through an opening (5) in the boundary (15).

10. The method as claimed in claim 6, wherein a signal is output when at least one of a) the distance (12, 13, 14) determined by the at least one distance sensor (7, 8, 9) corresponds to a previously determined distance, or b) the determined position of the measuring sensor (2) corresponds to a previously determined position.

11. The method of claim 6, wherein at least one of a) the measuring range (6) is two-dimensional or three-dimensional, or b) the measured variable is a flow rate.

* * * * *